United States Patent [19]

Schlichte et al.

[11] 4,351,985
[45] Sep. 28, 1982

[54] COUPLING SYSTEM FOR A TELECOMMUNICATION EXCHANGE INSTALLATION

[75] Inventors: Max Schlichte, Munich; Wolf Springstubbe, Gauting, both of Fed. Rep. of Germany

[73] Assignee: Siemens Aktiengesellschaft, Munich, Fed. Rep. of Germany

[21] Appl. No.: 27,354

[22] Filed: Apr. 5, 1979

Related U.S. Application Data

[63] Continuation of Ser. No. 765,342, Jan. 24, 1977, abandoned, which is a continuation of Ser. No. 644,866, Dec. 29, 1975, abandoned, which is a continuation of Ser. No. 386,281, Aug. 7, 1973, abandoned, which is a continuation of Ser. No. 163,588, Jul. 19, 1971, abandoned.

[30] Foreign Application Priority Data

Jul. 21, 1970 [DE] Fed. Rep. of Germany ....... 2036176

[51] Int. Cl.³ .............................................. H04Q 3/52
[52] U.S. Cl. .............................. 179/18 GF; 340/825.8
[58] Field of Search .................... 179/18 GE, 18 GF; 340/166 R; 307/112, 113, 115, 241, 242, 244

[56] References Cited

U.S. PATENT DOCUMENTS

| | | | |
|---|---|---|---|
| 3,400,220 | 9/1968 | Bowers | 179/18 GF |
| 3,480,913 | 11/1969 | Sherstiuk | 179/18 GE X |
| 3,546,390 | 12/1970 | Hackenberg et al. | 179/18 GE |
| 3,593,295 | 7/1971 | Joel, Jr. | 179/18 GE |
| 3,638,193 | 1/1972 | Opferman et al. | 179/18 GF |

Primary Examiner—Thomas W. Brown
Attorney, Agent, or Firm—Schuyler, Banner, Birch, McKie & Beckett

[57] ABSTRACT

A coupling system for a telecommunication exchange installation is described having a plurality of interconnected binary switching matrices. Each switching matrix has at least two row and two column lines with means for connecting row lines to column lines. A plurality of connection lines form input and output lines for the system of interconnected switching matrix. The interconnection arrangement for the interconnected switching matrices is such that a row line of at least one multiple is connected to a row line of another multiple or a connection line. The other row line of the one switching matrix is connected to a column line of another switching matrix or to a connection line. One column line of the one switching matrix is connected to a column line of another switching matrix or to a connection line. The other column line of the one switching matrix is connected to a row line of another switching matrix or to a connection line.

13 Claims, 9 Drawing Figures

COUPLING SYSTEM FOR A TELECOMMUNICATION EXCHANGE INSTALLATION

This is a continuation of application Ser. No. 765,342 filed Jan. 24, 1977, now abandoned, which is a continuation of application Ser. No. 644,866 filed Dec. 29, 1975, now abandoned, which is a continuation of application Ser. No. 386,281 filed Aug. 7, 1973, now abandoned, which is a continuation of application Ser. No. 163,588 filed July 19, 1971, now abandoned.

BACKGROUND OF THE INVENTION

The invention relates to telecommunication exchange installations, and particularly, the coupling point switching systems therein.

In rating the capacity of a telecommunication exchange system one must consider operational as well as economic points of view: on the one hand the exchange system must be so equipped that it can satisfy the burden of traffic while maintaining a prescribed quality in properly routing the traffic; on the other hand, the expense involved in the operation of the communication system should be as small as possible. Coupling systems are an essential component of telecommunication traffic systems. These arrangements of switching links have the function of connecting input lines with output lines, connections being chosen according to the routing desired. Every connection is formed through appropriate activation of one or more coupling point switches of a coupling system.

Coupling point switches of this sort are often arranged in a coupling system in the form of switching matrices, that is, in a configuration in which a specific input switching matrix row has access to a specific output switching matrix column over a (2 or 4 line) coupling point switch, which lies in the junction of the applicable switching matrix row and the applicable switching column. The size of the switching matrix used in a coupling system influences strongly the number of necessary coupling point switches and the extent of the holding information necessary for maintaining established connections. Theoretically, the task assigned to a coupling system with N/2 inputs and N/2 outputs demands, respectively, a combination of any N/2 different connections of a particular input with any particular output from a total of N/2 possible connection combinations, 2·(1dN/2) coupling point switches and a holding datum of $T=(1dN/2)\uparrow$ bits, where $(1dN/2)\uparrow$ denotes the next higher whole member after 1dN/2.

In practice, it is fundamentally the case that the larger the switching matrices of the coupling system are, the more coupling point switches are necessary, yet the less the extent of the necessary holding data is. Thus, for a single stage coupling system having N/2 input lines and N/2 output lines in the form of a quadratic coupling point matrix, $(N/2)^2$ coupling point switches are necessary with a holding data requirement of $Q=N/2\cdot(1dN/2)\uparrow$ bits. This is a practical necessity. Although, for a multiple stage coupling system which is composed of minimal switching matrices with 2 inputs and 2 outputs, respectively, a sharp decline of the necessary number of coupling point switches with a simultaneous increase of the necessary extent of holding data is to be expected.

Under certain conditions, however, not only can a saving be made on coupling point switches with application of such minimal switching matrices, but at the same time, a saving is achievable with respect to the necessary extent of holding data. Thus, it is known (Bell System Technical Journal, Vol XLIII, July, 1964, #4, Part 2, pages 1641 to 1656; Bell System Technical Journal, Vol. XLVII, May–June 1968, #5, pages 813 to 822; German Pat. No. 1,922,891) to use a coupling system for connecting N/2 input lines with N/2 output lines, which has switching matrices (binary switching matrices) having two first lines and two second lines, of which one first line is connected with either of said second lines, and the other of said first lines with the other of said second lines. Thus, in the switching matrices there is always a through-connection between the two first lines and the two second lines, namely an "uncrossed" or a "crossed" through-connection. The switching matrices are interconnected in such a manner that, respectively, both second lines of a preceding switching matrix are connected, respectively, with a first line of two succeeding switching matrices, and the two first lines of a succeeding switching matrix are connected, respectively, with a second line of two preceding coupling multiples. In such known coupling systems the three middle coupling stages of the binary switching matrices are combined pairwise in such a way that each of the two binary switching matrices of a pair of binary coupling multiples of a preceeding coupling stage is connected with each of the two binary switching matrices of a corresponding pair of binary switching matrices of the succeeding coupling stage. In the remaining coupling stages the two lines of the nth binary switching matrix of the kth coupling stage are connected, respectively, with a first line of the $(2n-1)$th and of the 2nth binary switching matrix of the—looking at the three middle coupling stages—$(k+1)$th coupling stage (given $0<n>N/8$), i.e., of the $(2n-1-N/4)$th and of the $(2n-N/4)$th binary switching matrix of the $(k+1)$th coupling stage (given $N/8<n\leq N/4$). With such a centrally symmetric construction $B=N/2\cdot1dN/2-N/4$ binary switching matrices are necessary, which are arranged in $2\cdot1dN/2-1$ stages (of differential configuration) to N/4 binary switching matrices, and with a range of holding data of likewise B bits; with unsymmetric so-called nested tree-type construction according to U.S. Pat. No. 3,593,295, and Bell System Technical Journal Vol. XLVII, May–June 1968, #5, pages 813 et seq., $J=N/2\cdot1dN/2-N/2+1$ binary switching matrices and a holding data capacity of J bits are necessary.

These known coupling systems, which in any case are free of blocking under appropriate rearrangement of existing connections, enable, meanwhile, only connections between the N/2 inputs on the one hand and the N/2 outputs on the other hand, and are, therefore, only suited for traffic between two groups of connecting lines. In practice, one must also, however, deal many times with traffic between connecting lines of one and the same group, which means for the coupling system that the differentiation between inputs and outputs disappears and that all N connecting lines must be connectable pairwise with each other in arbitrary combinations.

It is an object of the invention to provide a means to achieve a coupling system constructed only of binary switching matrices which satisfies these conditions.

SUMMARY OF THE INVENTION

The aforementioned and other objects are attained in a coupling system, constructed according to this invention, with a plurality of binary switching matrices having, respectively, only two first and two second lines; of which one first line is connected, respectively, with the one or the other second line, and the other first line is connected with the other. This coupling system, in accordance with the invention, is characterized by the fact that as a coupling system for traffic between all connecting lines connecting to the coupling system which thereby form simultaneously input and output lines of the coupling system it has at least one binary switching matrix which with its one first line is connected to a first line of another binary switching matrix or to a connecting line forming an input or output line of the coupling system. With its other first line it is connected to a second line of another binary switching matrix or to a connecting line forming an input or output line of the coupling system. With its one second line it is connected to a second line of another binary switching matrix or to a connecting line forming an input or output line of the coupling system, and with its other second line it is connected to a first line of another binary switching matrix or to a connecting line forming an input or output line of the coupling system.

In accordance with a further advantageous arrangement according to the invention the coupling system has N/4 binary switching matrices as a stepwise constructed coupling system for a traffic between N inputs and outputs in the middle coupling stage, which binary switching matrices are connected, respectively, with their one first line to a first line of another binary multiple coupling, with their other first line to a second line of another binary switching matrix, with their one second line to a second line of another binary switching matrix, and with their other second line to a first line of another binary switching matrix.

Preceding and following the coupling system, the $1+(-1+ld(N/2))\cdot ld(N/2)/2$ first stages of uncrossed and crossed through-connecting binary switching matrices of a known unsymmetrical nested tree-type coupling system are arranged for N/2 inputs and N/2 outputs, respectively. In contrast to the known coupling systems with several binary switching matrices in which the individual binary switching matrices are all arranged somewhat in the same through-connecting position, so that they effect either a crossed or an uncrossed through-connection from the two first lines to the two second lines, the invention uses an arrangement of binary switching matrices turned, so to speak, 90° from the binary switching matrices neighboring them, effecting therewith a crossed or a reflecting through-switching to some extent. This arrangement, in accordance with the invention, enables traffice between all connection lines of the coupling system forming simultaneously therewith an input and an output line, respectively, while maintaining the advantages of only small expense with respect to coupling point switches and of a likewise small range of necessary holding data. With the multiple stage construction of the coupling system in accordance with the given advantageous arrangement of details of the invention, a total of $S=N/2\cdot ldN/2-N/4+2$ binary switching matrices and a holding data range of S bits are necessary with N inputs and outputs; for the special case of N=4 a holding data range of only 2 bits is sufficient.

In another advantageous version of the invention every binary switching matrix can be directly controlled by a circulating store, which stores only one control bit per time channel, the bit belonging only to that binary switching matrix. This allows through-switching of message signals, especially PCM signals, in a time multiplex exchange station using circulating stores for correct time channel control of the coupling point switches forming the coupling system. Such a measure transmits not only the above described advantageous characteristics of a coupling system with binary switching matrices to a corresponding coupling system of a time multiplex exchange station, but makes these advantages even more significant insofar as the necessary circuitry expense in the time multiplex exchange station is reduced still further. Examples of such savings are that decoders, otherwise necessary in a time multiplex exchange station for coupling point switch control for avoidance of a still greater circulating storage expense, are saved. Insofar as freedom from blocking of the coupling system is achievable through rearrangements of existing connections if necessary, it can be brought about through rearrangement processes, which can be executed outside of the channels assigned to the connections in question, so that interference necessitated by line interruptions can be avoided on the connections in question. Thereby, these advantages become significant especially in the through switching of PCM signals, i.e., in a PCM time multiplex exchange station, because PCM signals are impaired very little as digital signals through the relatively high number of coupling stages of a time multiplex coupling system constructed with binary switching matrices.

In order to also be able to undertake a time channel exchange simultaneously with the through switching of a connection, as must be possible in general for the achieving of a sufficiently high attainability of a free time channel in the respective desired direction, intermediate stores can still be provided enabling a time channel exchange in the individual connections of the coupling system of the time multiplex exchange station, constructed in accordance with the invention.

In a further advantageous version of the invention, the coupling system has binary switching matrices necessary for the connection of connecting lines with connecting lines of other line bundles, i.e., with single connection lines, when connection lines forming a line bundle are connected to the coupling system, whereby the circuitry expense is further reduced.

BRIEF DESCRIPTION OF THE DRAWINGS

The invention will be best understood by reference to a detailed description of alternative preferred embodiments hereinbelow in conjunction with the drawings in which.

DETAILED DESCRIPTION OF THE DRAWINGS

Figure 1:
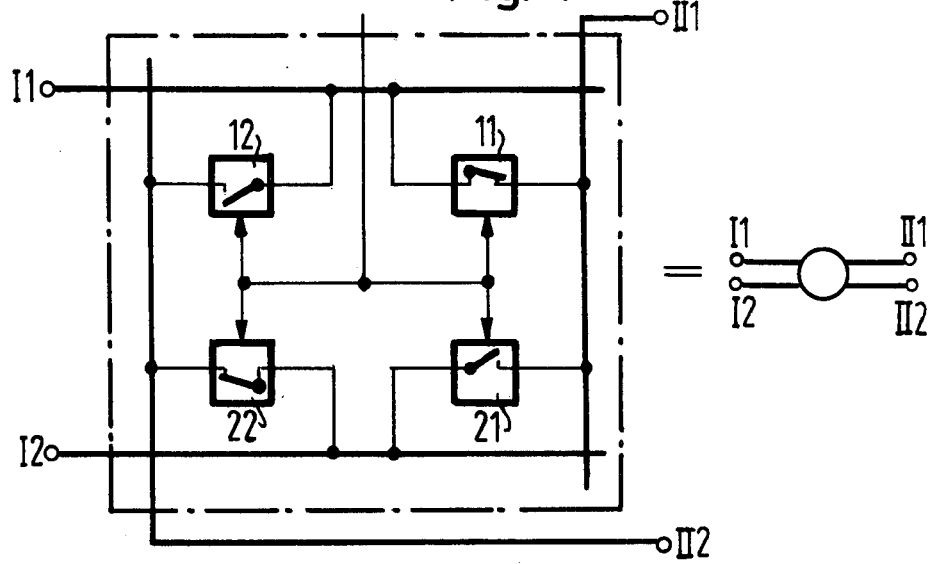
FIG. 1 is a schematic diagram of a prior art binary switching matrix.
Figure 5:
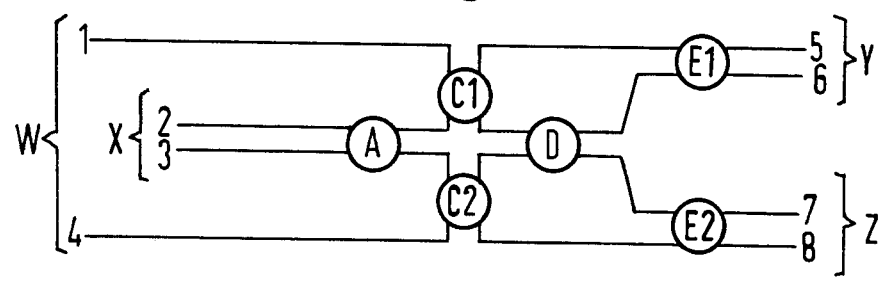
FIG. 5 is a schematic diagram of a further preferred embodiment of a coupling system constructed according to the principles of the invention.

FIG. 1 shows in its left part the circuitry details of a binary switching matrix. This binary switching matrix has two first lines, or row lines, I1 and I2 and two seconds lines, or column lines, II1 and II2. The first line I1 can be connected with the second line II1 over a coupling point switch 11 and with the second line II2 over a coupling switch 12, and the first line I2 can be connected with the second line II1 over a coupling point switch 21 and with the second line II2 over a coupling point switch 22. These connections are made in such a manner that the first line 11 is always connected to the second line II1 or with the second line II2 and the first line I2 conversely is always connected with the second line II2 so that in the analysis of the representation in FIG. 1 either an uncrossed or a crossed through switching of the 2 first lines I1 and I2 to the two second lines II1 and II2 is always given. Note here that in FIG. 1, the coupling point switches 11, 12, 21 and 22 are shown as one-wire switches, but in reality, may be 2-wire or 4-wire under given conditions. The binary switching matrix shown in the left part of FIG. 1 in its technical details is shown in the right hand part of FIG. 1 in a simplified symbolic form, which is then used in the following FIGS. 2, 3 and 5, representing coupling systems in accordance with the invention.

Figure 2:
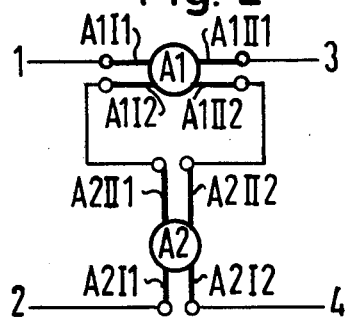
FIG. 2 is a schematic diagram of a first preferred embodiment constructed according to the principles of the invention.

FIG. 2 shows a first preferred embodiment of a coupling system in accordance with the invention for traffic between four connection lines 1, 2, 3 and 4 connected to the coupling system. These lines form simultaneously input and output lines of the coupling system, respectively. The coupling system is formed through two binary switching matrices A1 and A2, connected with each other in a specific way. The binary switching matrix A1 is connected with its one first line A1I1 to the connection line forming an input and output line of the coupling system and with its other first line A1I2 to the one second line A2II1 of the binary multiple coupling A2. The binary switching matrix A1 is connected with its one second line A1II2 to the other second line A2II2 of the binary switching matrix A2, and the binary switching matrix A1 is connected with its other second line A1II1 to the connection line 3 forming an input and output line of the coupling system. The binary switching matrix A2 is connected with its one first line A2I1 to the connection line 2 and with its other first line A2I2 to the connection line 4; as stated, with its one second line A2II1 it is connected to the one first line A1I2 and with its other second line A2II2 to the one second line A1II2 of the binary switching matrix A1.

The coupling system of FIG. 2 enables not only connections between the connection lines 1, 2 on the one hand and the connection lines 3, 4 on the other hand, but also connections between the connection lines 1 and 2, and between the connection lines 3 and 4. Next, it is assumed that the binary switching matrix A1 causes an uncrossed through-switching from the first lines A1I1, A1I2 to the second lines A1II1, A2II2 and that at the same time, the binary switching matrix A2 causes a crossed through-switching from the first line A2I1 to the second line A2II2 and from the first line A2II1 to the second line A2I2. It follows then that the connection line 1 is connected with the connection line 3, and that simultaneously the connection line 2 is connected with the connection line 4. One obtains the same result, when in an unaltered, uncrossed through-switching in the binary switching matrix A1, the binary switching matrix A2, represented as being rotated 90° with respect to the binary switching matrix A1, is in its switching state other than that portrayed in the previously observed example. In the former switching state, it effects to some extent a reflecting through of the switching from the first line A2I1 to the second line A2II1 and from the first line A2I2 to the second line A2II2. Also, in this case, the connection line 1 is connected with the connection line 3 and the connection line 2 with the connection line 4. By maintaining the reflecting through-switching of the binary switching matrix A2, but the crossed through-switching of the binary switching matrix A1, from its first line A1I1 to its second line A1II2, and from its first line A1I2 to its second line A1II1, the connection line 1 is connected with the connection line 4 and the connection line 2 is connected with the connection line 3. With crossed through-switching in the binary switching matrix A1, as well as in the binary switching matrix A2, finally, the connection line 1 is connected with the connection line 2 and the connection line 3 is connected with the connection line 4. Thus, in the coupling system represented in FIG. 2, every connection line can be connected with every other connection line, independent of the side of the coupling system to which the respective connection lines are connected.

Figure 3:
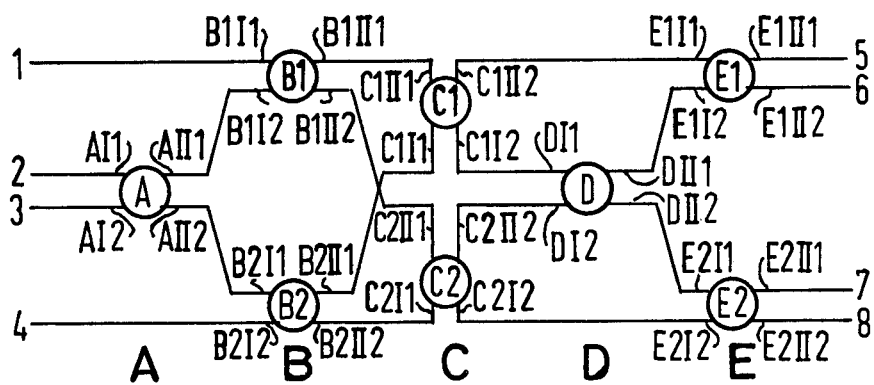
FIG. 3 is a schematic diagram of a second preferred embodiment of a coupling system constructed according to the principles of this invention.

The same applies also to the example shown in FIG. 3 of a coupling system in accordance with the invention for eight connection lines 1, 2, 3, 4, 5, 6, 7, 8. The coupling system shown in FIG. 3 for a traffic between N=8 inputs and outputs is constructed in a step-wise manner. The middle coupling stage C contains N/4=2 binary switching matrices C1 and C2, which are rotated 90° with respect to the remaining binary switching matrices A, B1, B2 of the preceeding coupling stages A, B, or binary switching matrices D, E1, E2 of the succeeding coupling stages D, E. The two binary switching matrices C1 (C2) are connected, respectively with their one first line C1I2 (C2I2), to a first line DI1 (E2I2) of another binary switching matrix D (E2) and are connected with their other first line C1I1 (C2I1) to a second line B2II1 (B2II2) of another binary switching matrix B2. With the one second line C1II1 (C2II1) the two binary switching matrices C1, C2 are connected, respectively, to a second line B1II1 (B1II2) of another binary multiple coupling B1, and with their other second line C1II2 (C2II2) they are connected, respectively, to a first line E1I1 (DI2) of another binary switching matrix E1 (D).

To the coupling stage containing the two binary switching matrices C1 and C2, which effect, respectively, a crossed, or a reflecting through connection, the $1+(-1+1d(N/2))\cdot 1d(N/2)/2$ first stages A, B, of uncrossed or crossed through-switching binary switching matrices A, B1, B2 of a known unsymmetric so-called nested tree-type coupling system for N/2=4 inputs and N/2=4 outputs are connected in series, whereby the two binary switching matrices B1 and B2 are connected with the binary switching matrices C1 and C2 in the previously stated manner. By this means, the two second lines AII1 and AII2 of the binary switching matrices A forming the first stage are connected with a first line B1I2 (B2I1) of these two binary switching matrices B1 and B2 of the second stage, and the remaining first lines B1I1 and B2I2 of these two binary switching matrices B1 and B2, as well as the two first lines AI1 and AI2 of the binary switching matrix A, are connected, respectively, with the connection lines 1, 4, 2, 3, of the coupling system forming simultaneously an input and an output line of the coupling systems. In corresponding manner, the remaining binary switching matrices D, E1 and E2 connected in the previously described manner with the two binary switching matrices C1 and C2, belong to the first $1+(-1+1d(N/2))\cdot 1d(N/2)/2$ stages D and E of uncrossed or crossed through switching binary switching matrices of a further known unsymmetrical nested tree-type coupling system for N/2 inputs and N/2 outputs. By this means, the two second lines DII1 and DII2 of the binary switching matrix D are connected, respectively, with a first line E1I2 (E2I1) of the two binary switching matrices E1 and E2, whose second lines E1II1 and E1II2 (E2II1 and E2II2) are connected with the connection lines 5 and 6 (7 and 8) forming an input and output line of the whole coupling system of FIG. 3.

The coupling system in FIG. 3 permits in a similar manner, as clarified with the aid of FIG. 2, each of the connection lines 1, 2, 3, 4, 5, 6, 7, 8, to connect with every other connection line, independent of which side of the coupling system shown in FIG. 3, the respective connection lines are on. Thus, a connection between the two connection lines 1 and 2 is accomplished, for example, over the binary switching matrices B1, C1, B2 and A, in that these couplings effect in the indicated order an uncrossed, a reflecting, an uncrossed and a crossed through switching. A connection, for example between the connection lines 1 and 5, is accomplished over the binary switching matrices B1, C1, D and E1, in that these couplings effect in the indicated order an uncrossed, a crossed, an uncrossed and crossed through-switching. In corresponding manner, all remaining possible connections of any two connection lines may be accomplished.

Figure 4:
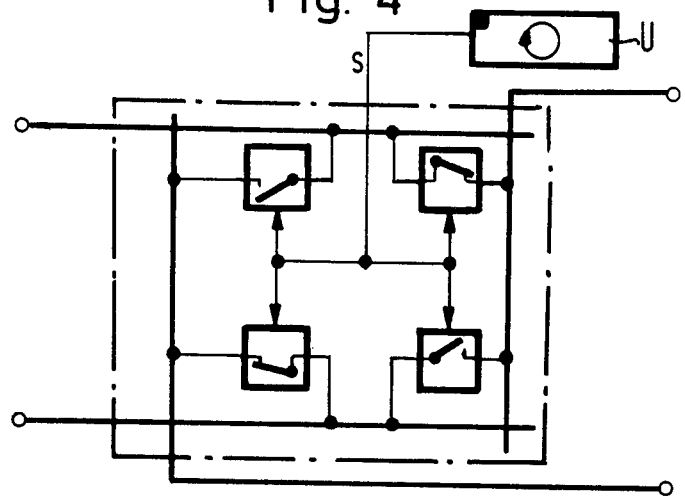
FIG. 4 is a schematic diagram of means by which control of a binary switching matrix according to the invention is effected forming a third preferred embodiment.

As indicated above, the coupling systems in accordance with the invention can be used with advantage for through-switching of message signals, especially PCM signals, in a time multiplex exchange station, whereby, then, should the occasion arise, rearrangements of existing connections can be executed to achieve a freedom from blocking of the coupling system outside of the time channels assigned to the connections in question. For correct time channel control of the coupling point switches of a coupling system in accordance with the invention used in a time multiplex exchange station circulating stores can be used, as is customarily done for this purpose in time multiplex exchange stations. The period of rotation of these stores corresponds to the time channel periopd. The coupling point switches of every binary switching matrix of a coupling system according to the invention are advantageously controlled by directly by a circulating store storing only one control bit per time channel and belonging only to this binary switching matrix. Such a control is illustrated in FIG. 4.

In this Figure, the circulating store is denoted U, and may be constructed in the known manner. Examples of suitable circulating or cyclic stores which may be used as store U in this embodiment are to be found in FIG. 4 of U.S. Pat. No. 3,271,521 and FIG. 5 of U.S. Pat. No. 3,296,377. For each time channel a control bit is stored in the circulating store U, and this bit appears on the control line s in accordance with the appropriate time channel, so that the coupling point switches of the binary switching matrix assume a position corresponding to the control bit stored for a particular time channel during the divisions of time of that time channel. For example, should a control bit "0" appear on the control line s, then the four coupling point switches of the binary switching matrix are in the switching state shown in FIG. 4. If a control bit "1" appears on the control line s, then the coupling point switches are placed into the other switching state, which they retain until a control bit "0" appears again on the control line. It should be noted here that as a rule decoders necessary in time multiplex exchange stations for control of coupling point switches for the purpose of reducing costs of the circulating store are avoided in a coupling system in accordance with the invention. In fact, the coupling point switches of a binary switching matrix are controlled directly by accompanying circulating stores. However, in a coupling system operated on a time multiplex basis in accordance with the invention the required circulating store costs are very slight.

As indicated above, a coupling system in accordance with the invention can be simplified through connection of connecting lines forming a line bundle, such that the binary switching matrices necessary for connection of such connection lines with connection lines of other line bundles i.e., with single connection lines are provided. FIG. 5 shows as an example for a simplified coupling system in comparison with the coupling system of FIG. 3, as it follows that when the connection lines 1 and 4, 2 and 3, 5 and 6, 7 and 8 are joined, respectively, to line bundles W, X, Y, Z, so that no connections between the connection lines 1 and 4, 2 and 3, 5 and 6 and 7 and 8 would have to be created. All connections between two connection lines of two different line bundles can be achieved with the coupling system of FIG. 5 in a manner corresponding to the above explanations of the coupling system of FIG. 3.

Whereas, the coupling system in FIG. 2 in every case is free of inner blockings at the outset, a freedom from blocking can be achieved in the coupling systems of FIG. 3 and FIG. 5, under certain conditions after appropriate rearrangement of existing connections. Yet, in general it can be achieved that a coupling system built with several binary switching matrices for N connection lines representing simultaneously input and output lines—in any case after corresponding rearrangement of existing connections—is always free of blocking. This is because the coupling system in accordance with a further advantageous version of the invention, as a stepwise constructed coupling system for a traffic between N connection lines in the middle coupling stage forming input and output lines simultaneously, and has N/4 binary switching matrix pairs. Of these one binary switching matrix is connected, respectively, to the two first or to the two second lines of other binary switching matrices and which with two further lines both binary switching matrices are connected, should the occasion arise, respectively, to a second line of two binary switching matrices of a neighboring coupling stage as well as with the remaining two lines of the other binary switching matrix to a first line of two binary switching matrices of a neighboring coupling stage. Before and after this middle coupling stage the $1+(-1+1d(N/2))\cdot 1d(N/2)/2)-1)$ first stages of uncrossed or crossed through-switching binary switching matrices of a known nested tree-type coupling system for N/2 inputs and N/2 outputs are arranged, respectively.

A coupling system constructed, thusly, in accordance with the invention preserves the advantages of a small expense for coupling point switches and of an equally small cost for necessary holding data. A coupling system for N connection lines requires a total of $S=2+N(1d(N/2)-1)$ binary switching matrices and a holding data range of S bits.

Figure 6:
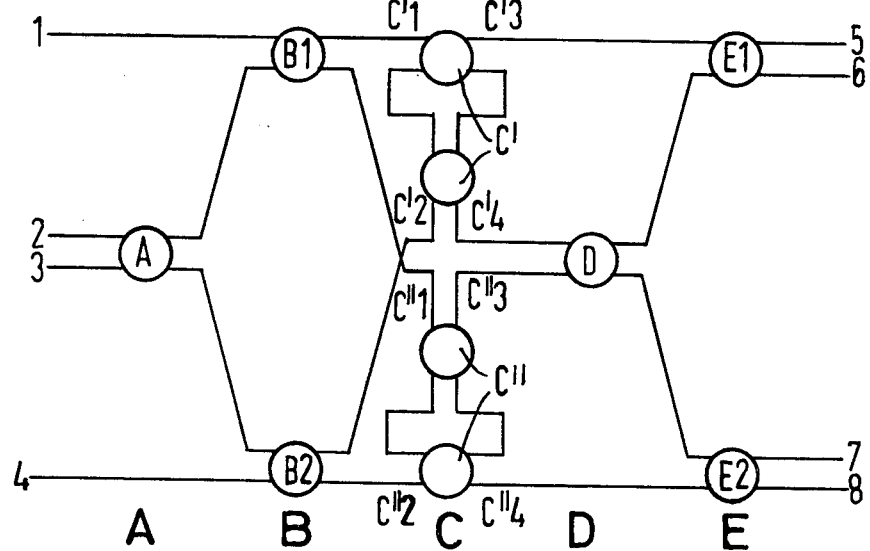
FIG. 6 is a schematic diagram of a fifth preferred embodiment of a coupling system constructed according to the principles of the invention.

FIG. 6 shows an example of such a coupling system in accordance with the invention for eight connection lines 1, 2, 3, 4, 5, 6, 7, 8. It should be noted that the coupling system again can be operated on a time multiplex basis, whereto the binary switching matrices can be controlled in the manner shown in FIG. 4. The coupling system shown in FIG. 6 for traffic between N=8 connection lines is constructed step-wise. The middle coupling stage C contains N/4=2 binary switching matrix pairs C' and C'', whose binary switching matrices are connected with each other in the manner shown in FIG. 2. That is, one binary switching matrix is connected with a first line and with a second line to the two first or the two second lines of the other binary switching matrix, respectively. With two further lines C'1 and C'2 of its two binary switching matrices the binary switching matrix pair C' is connected, respectively, to a second line of the two binary switching matrices B1 and B2 of the neighboring coupling stage B. In corresponding manner the binary switching matrix pair C'' is connected with its two further lines C''1 and C''2 of its two binary switching matrices, respectively, to a second line of the two binary switching matrices and to a second line of the two binary coupling multiples B1 and B2 of the neighboring coupling stage B. With the remaining 2 lines C'3 and C'4 of its two binary coupling multiples, the binary switching matrix pair C' is connected to a first line of the two binary switching matrices D and E1 of the neighboring coupling stages D and E. In corresponding manner, the binary switching matrix pair C'' is connected with the remaining two lines C''3 and C''4 of its two binary switching matrices, respectively, to a first line of the two binary switching matrices D and E2 of the neighboring coupling stages D, E. To the coupling stage C containing the two binary switching matrices C' and C'' which effect respectively, a—generalizing from the explanations for FIG. 2—crossed, an uncrossed or a reflecting through-switching, are connected in series the $(-1+1d(N/2))\cdot(1+1d(N/2))/d=2$ first stages A and B of uncrossed or crossed through-switching binary switching matrices A, B1, B2 of a known nested tree-type coupling system for N/2 inputs and N/2 outputs. Thus, the two binary switching matrices B1 and B2 are connected with the binary switching matrix pairs C' and C'' in the previously described manner. By this means, the two second lines of the binary switching matrix A forming the first coupling stage are connected, respectively, with a first line of the two binary switching matrices B1 and B2, and, as well, the two first lines of the binary switching matrix A are connected with the connection lines 1, 4, 2, and 3 forming, respectively, an input or an output line of the coupling system. In corresponding manner, the binary switching matrices D, E1, and E2, connected with the two binary switching matrix pairs C' and C'', in the previously stated manner, belong to the first $(-1+1d(N/2))\cdot(1+1d(N/2))/d=2$ stages D and E of uncrossed or crossed through-switching binary switching matrices of a further known nested tree-type coupling system for N/2 inputs and N/2 outputs. By this means, the two second lines of the binary switching matrix D are connected with the first line of the two binary switching matrices E1 and E2, respectively. These second lines are connected with the connection lines 5 and 6, forming, respectively, an input and an output line of the coupling system.

The coupling system in FIG. 6 permits connection of each of the connection lines 1, 2, 3, 4, 5, 6, 7, 8, with every other connection line independent of which side of the coupling system shown in FIG. 6 the respective connection lines are on. Thus, for example, connections between the connection lines 1 and 5, 2 and 4, 3 and 8, and 6 and 7 are achieved such that the binary switching matrices A, B1, B2 and E1 effect an uncrossed through-switching just as the binary switching matrices D and E2 effect a crossed through switching, and finally the binary switching matrix pair C'' effects a reflecting through-switching. In corresponding manner, all remaining possible combinations of connection lines taken two at a time can be achieved, and if necessary, after a rearrangement of the connections already directed over the coupling system, in all possible connection combinations.

It should be noted that, diverting from the representation in FIG. 6, the partial coupling systems lying to the right and left of the middle coupling stage can also be connected together with the middle coupling stage when rotated 180°.

Figure 7:
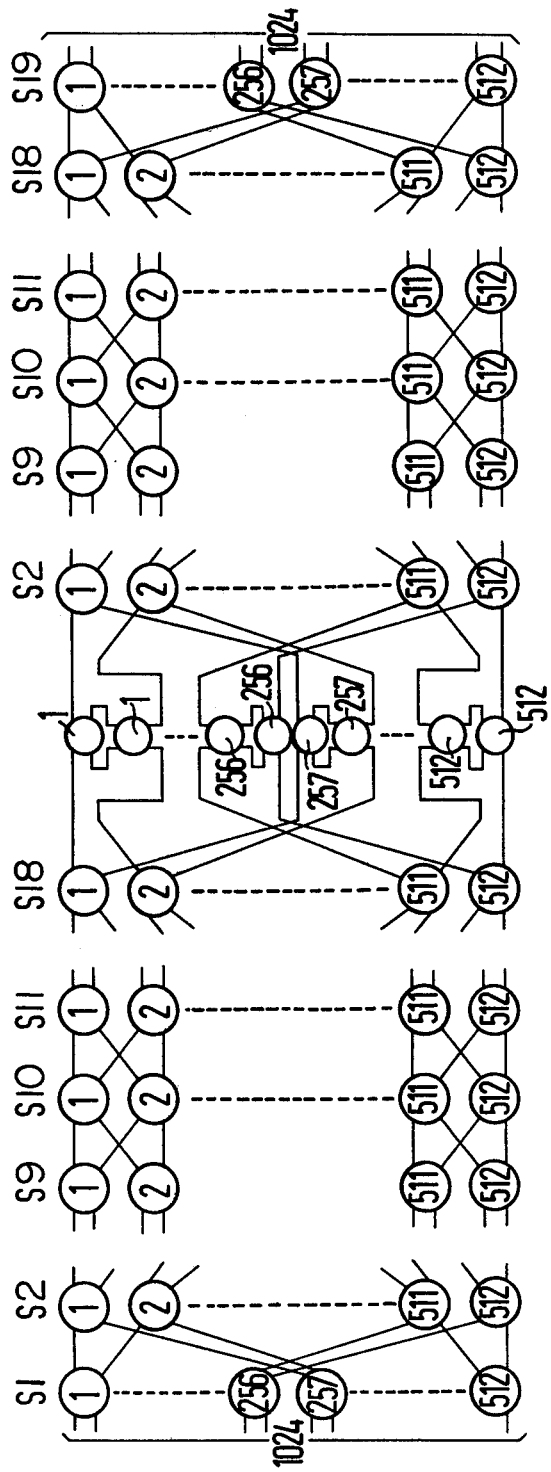
FIG. 7 is a schematic diagram of a modification of the coupling system shown in FIG. 6.

One can obtain the last mentioned advantages, also with a symmetrically constructed coupling system, in that the coupling system of FIG. 6 in a further version of the invention, is modified, (see FIG. 7) so that again the middle coupling stage has N/4 binary switching matrix pairs. Of these, one binary switching matrix is connected with a first line and a second line to the two first or the two second lines of the other binary switching matrices. These pairs are connected with two further lines of the binary switching matrix to a second line of two binary switching matrices of a neighboring coupling stage, as well as with the remaining two lines of the other binary switching matrices, and if necessary, to a first line of two binary switching matrices of a neighboring coupling stage. In front of and behind this middle coupling stage (2·1dN/2−2) coupling stages (S1, S2, ..., S9, S10, S11, ..., S18) of uncrossed or crossed through switching binary switching matrices are arranged, in whose (1dN/2−2) coupling stages furthest from the named middle coupling stage (S1, S2, ...) and in whose (1dN/2−3) coupling stages nearest the named coupling stage (... S18), in a known manner, the two second lines of the nth binary switching matrix of the kth coupling stage are connected with respectively a first line of the (2n−1)th and of the (2n)th binary switching matrix of the—looking at the three remaining coupling stages (S9, S10, S11);—(k+1)th coupling stage (given $0<n\leq N/8$). That is, of the (2n−1−N/4)th and of the (2n−N/4)th binary switching matrix of the (k+1)th coupling stage ($N/8<n\leq N/4$) and in whose remaining three coupling stages the binary switching matrices are combined pairwise in such a way that each of the two binary switching matrices of a pair of binary switching matrices of a preceeding coupling stage is connected with each of the two binary switching matrices of a corresponding pair of binary switching matrices of the succeeding coupling stage.

Figure 8:
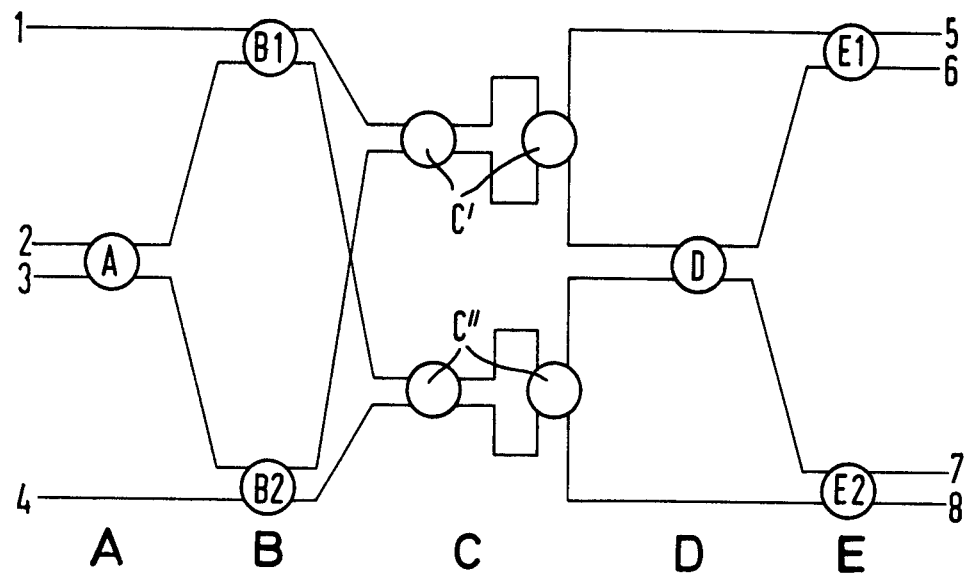
FIG. 8 is a schematic diagram of a further modification of the coupling system shown in FIG. 6.
Figure 9:
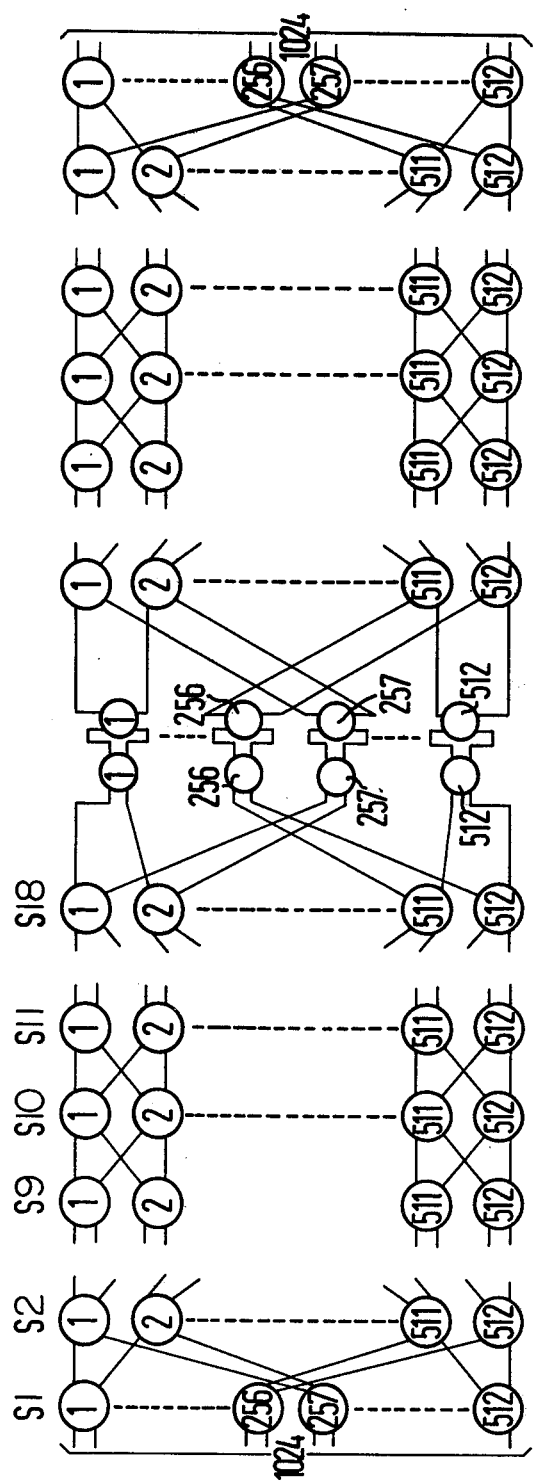
FIG. 9 is a schematic diagram of a still further modification of the coupling system shown in FIG. 6.

Finally, the last mentioned advantages are not tied to the previously indicated formation of a stage of binary switching atrix pairs (1, 1; ... 256, 256; ... 512, 512), but are rather achieved in general when, in accordance with a further feature of the invention a coupling system with several interconnected binary switching matrices has on the one hand two partial coupling systems (see FIG. 9), which contain either $(-1+1d(N/2))\cdot(1+1d(N/2))/d$ coupling stages of uncrossed or crossed through-switching binary switching matrices of a known nested tree-type coupling system for N/2 inputs and N/2 outputs (e.g., 1024, as shown, or $-2+2\cdot(1d(N/2))$ coupling stages of uncrossed or crossed through-switching binary switching matrices in whose $8-2+1d(N/2))$ outer coupling stages (S1, S2 ..., S9, S10, S11, ... S18) and $(-3+1d(N/2))$ inner coupling stages in a known manner the two second lines of the nth binary switching matrix of the kth coupling stage are connected with a first line of the (2n−1)th and of the (2n)th binary switching matrix of the—looking at the remaining coupling stages (S9, S10, S11)—(k+1)th coupling stage (given $0<n\leq N/8$). That is, of the (2n−1−N/4)th and of the (2n−N/4)th binary switching matrix of the (k+1)th coupling (given $N/8<n\leq N/4$), and in whose remaining three coupling stages the binary switching matrix are combined pairwise in a known manner, such that each of the two binary switching matrices of a pair of binary switching matrices of a preceeding coupling stage is connected with each of the two binary switching matrices of a corresponding pair of binary switching matrices of a succeeding coupling stage. The pair of binary switching matrices has between these two partial coupling systems N/4 uncrossed or crossed through-switching binary switching matrices, as well as N/4 further binary switching matrices, respectively, preceeding or following such a binary switching matrix. Their first lines are connected to a first line of another binary switching matrix, with their other first line to a second line of another binary switching matrix, with their one second line to a second line of another binary switching matrix, and with their second line to a first line of another binary switching matrix. Applied for example to the circuitry of FIG. 6, that means that the binary switching matrix pairs C' and C" provided there, rotated as it were 90°, are connected together with the two partial coupling systems formed from the remaining coupling stages A, B and D, E (see FIG. 8). The single binary switching matrix pairs in this arrangement can be rotated in a different sense of rotation. With such a version of a coupling system in accordance with the invention is tied the advantage of being able to install completely unaltered as a partial coupling system one of the known binary switching matrix—coupling systems constructed centrally symmetrically with $-1+2(1d[N/2])$ coupling stages or nested tree-type with $\frac{1}{2}\cdot 1dN/2\cdot(1dN/2+1)$ coupling stages, to be able to expand these known coupling systems to a coupling system in accordance with the invention and thus to provide them with further possibilities of installation.

The various preferred embodiments of the invention described hereinabove are only exemplary of the principles of the invention. It is contemplated that a number of modifications and changes can be made within the scope of the appended claims, which alone define the scope of the invention.

We claim:
1. A coupling system comprising:
a number of input/output connection lines selectively interconnectable over the coupling system for carrying traffic between N input/output terminals, and
a plurality of interconnected binary switching matrices (A1, A2), each of said matrices having a first pair of leads (I1, I2) and a second pair of leads (II1, II2), each of said first lead pairs being selectively connectable over said matrix to one of said second lead pairs,
at least one of said matrices (A1) having one of said first lead pairs (A1I1) connected to one of said connection lines (1),
the other lead of said first lead pair (A1I2) of said one matrix being connected to one lead of the second lead pair (A2II1) of another of said matrices,
one lead of said second pair (A1II2) of said one matrix being connected to one lead of said second lead pair (A2II2) of said another matrix (A2), and
the other lead of said second pair (A1II1) of said one matrix being connected to one of said connection lines (3).
2. A coupling system comprising:
a number of input/output connection lines selectively interconnectable over the coupling system for carrying traffic between N input/output terminals, and
a plurality of interconnected binary switching matrices (A1, A2), each of said matrices having a first pair of leads (I1, I2) and a second pair of leads (II1, II2), each of said first lead pairs being selectively connectable over said matrix to one of said second lead pairs,
at least one of said matrices (A2) having one lead of said first lead pairs connected to one of said connection lines (2),
the other lead of said first lead pair (A2I2) of said one matrix being connected to another of said connection lines (4),
one lead of said second pair (A2II2) of said one matrix being connected to one lead of said second lead pair (A1II2) of said another matrix (A1), and
the other lead of said second lead pair (A2II1) of said one matrix being connected to a first lead (A1I2) of said another matrix (A1).
3. A coupling system comprising:
a number of input/output connection lines selectively interconnectable over the coupling system for carrying traffic between N input/output terminals where $N=2^m$ and $m\geq 3$, and
a plurality of interconnected binary switching matrices (C1, C2), each of said matrices having a first pair of leads (I1, I2) and a second pair of leads (II1, II2), each of said first lead pairs being selectively connectable over said matrix to one of said second lead pairs,
at least one of said matrices (C1, C2) having one lead of said first lead pairs (C1I2, C2I2) connected to one lead of the first lead pairs (D1I, E2I2) of another matrix,
the other lead of said first lead pair (C1I1, C2I1) of said one matrix being connected to one lead of the second lead pair (B2II1, B2II2) of another matrix (B2), one lead of said second pair (C1II1, C2II1) of said one matrix being connected to one lead of the second lead pair (B1II1, B1II2) of another matrix (B1), and the other lead of said second lead pair (C1II2, C2II2) of said one matrix being connected to one lead of a first lead pair (E1I1, DI2) of another matrix (E1,D).

4. The coupling system defined in claim 3 constructed in the form of a staged coupling system having a plurality of coupling stages, each stage comprising at least one of said binary switching matrices, said staged coupling system including:

a central coupling stage comprising N/4 of said matrices coupled to one of two sets of N/2 of said input/output terminals on either side thereof, and a number $1+(1d(N/2)-1)(1d(N2))$ where $1d$ denotes the logarithm to the base 2, of non-central stages connected between said central stage and said input/output terminals, each of said non-central stages including at least one binary matrix connected between said central stage and each one of said two sets of terminals, each of N/4 matrices (C1, C2) of said central stage having one lead of its said first lead pair (C1I2, C2I2) connected to one lead of the first leads (DI1, E2I2) of one of said matrices (D;E2) of said non-central stages, the other lead of said first lead pair (C1I1; C2I1) of each said central stage matrix being connected to one lead of said second lead pair (B2II1; B2II2) of another of said non-central stage matrices (B2), one lead of each said N/4 matrices second lead pair (C1II1, C2II1) being connected to one lead of said second lead pair (B1II1; B1II2) of one of said non-central stage matrices (B1, B2) and the other lead of said second lead pair of each of said N/4 matrices being connected to one lead of said first leads of said non-central stage matrices.

5. The coupling system of claim 4 wherein said matrices of said non-central stages comprise a nested tree-type arrangement, said one and said other first leads of said lead pairs of said central stage matrices being connected to matrices of non-central stages on opposite sides of said central stage and said one and said other second leads of said lead pairs of said central stage matrices being connected to matrices of non-central stages on opposite sides of said central stage.

6. A coupling system comprising:

a number of input/output connection lines selectively interconnectable over the coupling system for carrying traffic between N input/otuput terminals, and a plurality of interconnected binary switching matrices, each of said matrices having a first pair of leads and a second pair of leads (II1, II2), each of said first lead pairs being selectively connectable over said matrix to one of said second lead pairs, wherein said binary switches are arranged in a plurality of coupling stages and having a set of N/2 of said input/output terminals at either end of said system, a central stage comprising N/4 pairs (C′,C″) of said binary matrices, a number $-1+((1+1d(N/2))1d(N/2))/2$, where $1d$ denotes the logarithm to the base 2, of non-central stages (A, B, D, E) connected between said central stage and each said set of input/output terminals, each said stage comprising at least one of said binary matrices, in each matrix pair of said N/4 matrix pairs a lead of said first lead pair and a lead of said second lead pair of one matrix of said pair are connected to the two leads of one pair of the other matrix of said matrix pair (see connections of matrices C′), two remaining leads (C′1, C′2) of each of said matrix pairs being connected to two of said non-central stage matrices (B1, B2) on one side of said central stage, and the two remaining leads (C′3, C′4) of each of said matrix pairs being connected to leads of the first lead pair of two of said non-central stage matrices (E1, D) on the other side of said central stage, the matrices of said non-central stages comprising a nested, tree-type arrangement.

7. A coupling system comprising:

a number of input/output connection lines selectively interconnectable over the coupling system for carrying traffic between N input/output terminals, and a plurality of interconnected binary switching matrices, each of said matrices having a first pair of leads and a second pair of leads (II1, II2), each of said first lead pairs being selectively connectable over said matrix to one of said second lead pairs, wherein said binary switching matrices are arranged in a plurality of coupling stages interconnecting said terminals, said terminals being arranged in sets comprising N/2 input/output terminals per set at either end of said system, one of said coupling stages being a central stage having N/4 pairs of said binary matrices, a number $-2+2(1d(N/2))$, where $1d$ denotes the logarithm to the base 2, of non-central through-switching coupling stages being coupled between said central stage and each said set of input/output terminals preceding and succeeding, in the direction of a connection, said central coupling stage, and a first matrix in each said N/4 pairs of binary matrices of said central stage having one lead of the first lead pair of one of the second lead pair thereof connected to one lead pair of the second matrix in said each N/4 pair, the remaining leads of said first and second pairs of said first matrix of each said N/4 pair being connected, respectively, to one of the leads of the second lead pair of a binary matrix in one of said preceding non-central stages, and one of the leads of the first lead pair of a binary matrix in one of said succeeding coupling stages, the remaining lead of said first pair comprising the first or second lead pair of said second matrix being connected to one lead of the first or second lead pairs of binary matrices in non-central stages on opposite sides of said central stage, wherein the $(-2+1d(N/2))$ non-central coupling stages remotest from said central coupling stage and in the $(-3+1d(N/2))$ coupling stages nearest said central coupling stage in each of said connection directions, said second lead pair of the nth binary through-switching matrix of a kth one of said non-central coupling stages are connected, respectively, with a one lead of the first lead pair of the (2n−1)th matrix and one lead of the first lead pair of the (2n)th coupling matrix of a (k+1)th one of said non-central coupling stages, where $0 < n \leq N/8$, or of the $(2n-1-N/4)$th and $(2n-N/4)$th matrices of the $(k+1)$th stage, where $N/8 < N \leq N/4$, and where k is a whole number $(k=1, 2, 3 \ldots)$ indicating the particular coupling stage of a system having k coupling stages, the binary matrices of the remaining three non-central stages being combined in pairs, each of the two matrices in a pair in a preceding coupling stage in one of said directions of connection being connected with each of the two matrices in the corresponding pair of coupling matrices of the succeeding coupling stage.

8. A coupling system comprising:

a number of input/output connection lines selectively interconnectable over the coupling system for carrying traffic between N input/output terminals, and a plurality of interconnected binary switching matrices, each of said matrices having a first pair of leads and a second pair of leads (II1, II2), each of said first lead pairs being selectively connectable over said matrix to one of said second lead pairs, wherein said input/output terminals are arranged in sets comprising N/2 of said input/output terminals, said switching matrices being arranged in the form of a staged coupling system including first and second partial systems each having $(-1+1(1+1d(N/2))1d(N/2))(\frac{1}{2})$, where 1d denotes the logarithm to the base 2, coupling stages, the matrices of each partial system being arranged in a nested, tree-type construction for connection with one of said sets of N/2 input/outputs, in each of said partial systems, considering the $-2+1d(N/2)$ outer coupling stages and the $-3+1d(N/2)$ inner coupling stages, the two leads of the second lead pair of the nth matrix of the kth coupling stage, where k is a whole number $(k=1, 2, 3 \ldots)$ indicating the particular coupling stage of a system having k coupling stages, being connected respectively to one of the first lead pair of the $(2n-1)$th matrix and one of the first lead pair of the $(2n)$th matrix of a—looking at the remaining 3 coupling stages—$(k+1)$th coupling stage (given $N/8 < n \leq N/4$), and in the remaining 3 coupling stages the matrices are combined pairwise also in such a manner, that each of the two matrices of each said pair of matrices of a preceding coupling stage is connected with each of the two matrices of a corresponding pair of the following coupling stage, each of said partial systems being located between a central portion and one of said sets of terminals, said central portion between said two partial coupling systems having N/4 binary matrices, said N/4 matrices being preceded or succeeded, in the direction of a connection, by N/4 additional matrices which are connected, respectively, such that one lead of the first lead pair of each matrix is connected to one lead of the first lead pair of another of said coupling matrices, the other lead of the first lead pair thereof being connected to one lead of the second pair of another of said coupling matrices, one lead of said second lead pair of said N/4, matrices being connected to one lead of the second lead pair of another of said coupling matrices and said other lead of said second lead pair being connected to one lead of said first lead pair of another coupling matrix.

9. A coupling system comprising:

a number of input/output connection lines selectively interconnectable over the coupling system for carrying traffic between N input/output terminals, and a plurality of interconnected binary switching matrices, each of said matrices having a first pair of leads and a second pair of leads (II1, II2), each of said first lead pairs being selectively connectable over said matrix to one of said second lead pairs, wherein said input/output terminals are arranged in sets comprising N/2 of said input/output terminals at either end of said system, said switching matrices being arranged in the form of a staged coupling system including first and second partial systems each having $-2+2(1d(N/2))$, where 1d denotes the logarithm to the base 2, coupling stages, in each of said partial systems, considering the $-2+1d(N/2)$ outer coupling stages (S1, S2 . . . ) and the $-3+1d(N/2)$ inner coupling stages ( . . . S18), the two leads of the second lead pair of the nth matrix (256) of a kth coupling stage (S1) being connected respectively to one of the first lead pair of the $(2n-1)$th matrix (511) and one of the first lead pair of the $(2n)$th matrix (512) of a—looking at the remaining three coupling stages (S9, S10, S11)—$(k+1)$th coupling stage (S2) (given $0 < n \leq N/8$) and to one lead of the first lead pair of the $(2n-1-N/4)$th matrix and one of the first lead pair of the $(2n-N/4)$th matrix of a—looking at the remaining coupling stages—$(k+1)$th coupling stage (given $N/8 < n \leq N/4$), and in the three remaining coupling stages (S9, S10, S11) the matrices being so connected that each of the two matrices (1, 2) of a pair of matrices of a preceding coupling stage (S9) is connected with each of the two matrices (1, 2) of a corresponding pair of the following coupling stage (S10), each of said partial systems being located between a central portion and one of said sets of terminals, said central portion between said two partial coupling systems having N/4, coupling matrices, said N/4 coupling matrices being preceded or succeeded, in the direction of a connection of said sets of terminals by N/4 additional matrices being connected, respectively, such that one lead of the first lead pair thereof is connected to one lead of the first lead pair of another of said coupling matrices, the other lead of said first lead pair thereof being connected to one lead of the second lead pair of another of said coupling matrices, one lead of the second lead pair thereof being connected to one of the second lead pair of another of said coupling matrices, and the other lead of said second lead pair being connected to one lead of said first lead pair of another coupling matrix.

10. The coupling system defined in any of claims 1, 2, 3, 4, 5, 6, 7, 8 or 9 further comprising circulating store means for controlling the switching time of each said matrix.

11. The coupling system defined in any of claims 4, 5, 6, 7, 8 or 9 wherein said connection lines are formed into line bundles, said matrices being arranged as to be operable to form connections between connection lines in differing line bundles.

12. A coupling system comprising:
a number of input/output connection lines selectively interconnectable over the coupling system for carrying traffic between N input/output terminals and
a plurality of interconnected binary switching matrices including at least one through-switching matrix and at least one reflecting matrix, each of said matrices having a pair of first leads and a pair of second leads, each of said first leads being selectively connectable over said matrix to one of said second leads,
said system comprising a centrally located stage with respect to said terminals including at least a reflecting binary switching matrix, turned 90° from said through-switching matrix with respect to said terminals,
said reflecting matrix having one lead of said first leads and one lead of said second leads leading to the terminals connected to preceding portions of said system and the other lead of said first leads and the other lead of said second leads connected to the terminals leading to following portions of said system,
whereby said reflecting matrix comprises means for reflecting signals between said terminals on the same side of said central stage and for crossing signals over between terminals on one side and the other said central stage.

13. A coupling system comprising:
a number of input/output connection lines selectively interconnectable over the coupling system for carrying traffic between N input/output terminals and
a plurality of interconnected binary switching matrices, each of said matrices having a first pair of leads and a second pair of leads, each of said first lead pairs being selectively connectable over said matrix to one of said second lead pairs, one of said matrices having one lead of said first lead pair connected to one lead of the first lead pair of another matrix,
the other lead of said first lead pair of said one matrix being connected to one lead of the second lead pair of said another matrix,
one lead of said second lead pair of said one matrix being connected to one lead of said second lead pair of said another matrix,
the other lead of said second lead pair of said one matrix being connected to a first lead of said another matrix.

* * * * *